US009996056B2

(12) United States Patent
Maier

(10) Patent No.: US 9,996,056 B2
(45) Date of Patent: Jun. 12, 2018

(54) METHOD FOR DETERMINING A PARAMETER SET OF A PERISHABLE PRODUCT AND CONTROL SYSTEM FOR IMPLEMENTING THE METHOD

(71) Applicant: Rieber AG, Eschlikon (CH)

(72) Inventor: Max Maier, Ludwigsburg (DE)

(73) Assignee: RIEBER AG, Eschlikon (CH)

( * ) Notice: Subject to any disclaimer, the term of this patent is extended or adjusted under 35 U.S.C. 154(b) by 0 days. days.

(21) Appl. No.: 14/334,849

(22) Filed: Jul. 18, 2014

(65) Prior Publication Data
US 2015/0022313 A1 Jan. 22, 2015

(30) Foreign Application Priority Data
Jul. 18, 2013 (DE) .......................... 10 2013 011 987

(51) Int. Cl.
G05B 1/01 (2006.01)
G06K 7/14 (2006.01)
G06Q 10/08 (2012.01)

(52) U.S. Cl.
CPC ............. G05B 1/01 (2013.01); G06K 7/1404 (2013.01); G06Q 10/08 (2013.01)

(58) Field of Classification Search
CPC . G05B 1/01; G01K 3/04; G01K 1/022; G06K 19/0717; G06K 7/1404; G06Q 10/08; G06Q 10/087; B01D 53/30
See application file for complete search history.

(56) References Cited

U.S. PATENT DOCUMENTS

| 6,712,276 B1* | 3/2004 | Abali | G01D 9/005 235/380 |
| 6,865,516 B1* | 3/2005 | Richardson | G01K 1/024 340/870.17 |
| 2001/0033233 A1* | 10/2001 | Jentsch | A61J 1/05 340/870.17 |
| 2002/0116155 A1* | 8/2002 | Mayer | B01D 53/30 702/188 |

(Continued)

FOREIGN PATENT DOCUMENTS

| DE | 10161268 | 7/2003 |
| DE | 10161268 A1 | 7/2003 |

(Continued)

OTHER PUBLICATIONS

German Office Action dated Mar. 6, 2014 for the Corresponding German Patent Application No. 10 2013 011 987.1.

(Continued)

*Primary Examiner* — Orlando Bousono
(74) *Attorney, Agent, or Firm* — Hassan Abbas Shakir; Katten Muchin Rosenman LLP

(57) ABSTRACT

The present invention relates to a method for controlling a parameter set of a perishable product. According to the invention it is contemplated that an identification (ID) representing the perishable product is detected by a reading device, that the identification of the ID prompts a detection of the parameter set of the product, that a comparison between the identified parameter set and a reference parameter set is carried out, and that a control signal is generated and represented based on the comparison. The present invention further relates to a control system designed for implementing the method.

20 Claims, 4 Drawing Sheets

(56) References Cited

U.S. PATENT DOCUMENTS

| | | | |
|---|---|---|---|
| 2003/0036885 A1* | 2/2003 | Suermondt | G01K 1/022 702/187 |
| 2004/0148117 A1* | 7/2004 | Kirshenbaum | G07C 1/00 702/82 |
| 2004/0204881 A1* | 10/2004 | Mayer | B01D 53/30 702/79 |
| 2005/0021279 A1* | 1/2005 | Kuepper | G01K 3/04 702/127 |
| 2005/0091113 A1 | 4/2005 | Mitchell et al. | |
| 2005/0248455 A1* | 11/2005 | Pope | G01K 1/024 340/539.27 |
| 2006/0145863 A1* | 7/2006 | Martin | B65D 79/02 340/572.8 |
| 2007/0258048 A1* | 11/2007 | Pitchers | G06K 17/00 353/26 R |
| 2008/0047282 A1* | 2/2008 | Bodin | G06Q 10/08 62/129 |
| 2008/0294488 A1 | 11/2008 | Gupta et al. | |
| 2010/0065631 A1* | 3/2010 | Orlewski | G06Q 30/00 235/383 |
| 2011/0084128 A1* | 4/2011 | Haarer | G01K 3/04 235/375 |
| 2011/0258130 A1* | 10/2011 | Grabiner | G06Q 10/087 705/317 |
| 2013/0105564 A9* | 5/2013 | Haarer | G01K 15/007 235/375 |

FOREIGN PATENT DOCUMENTS

| | | |
|---|---|---|
| WO | 01/27577 A2 | 4/2001 |
| WO | 2006/105032 A1 | 10/2006 |

OTHER PUBLICATIONS

European Search Report dated Nov. 19, 2014 for the Corresponding EP Patent Application No. 14177017.2.

* cited by examiner

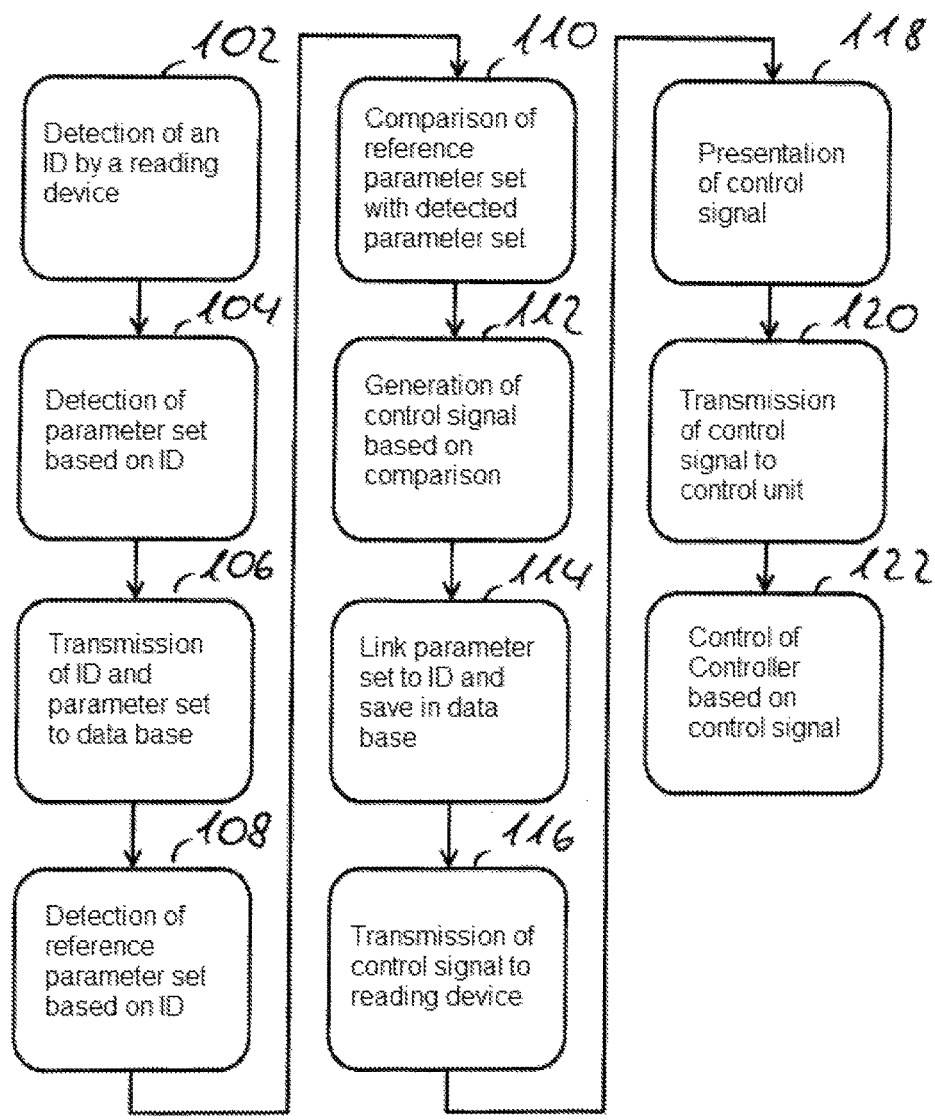

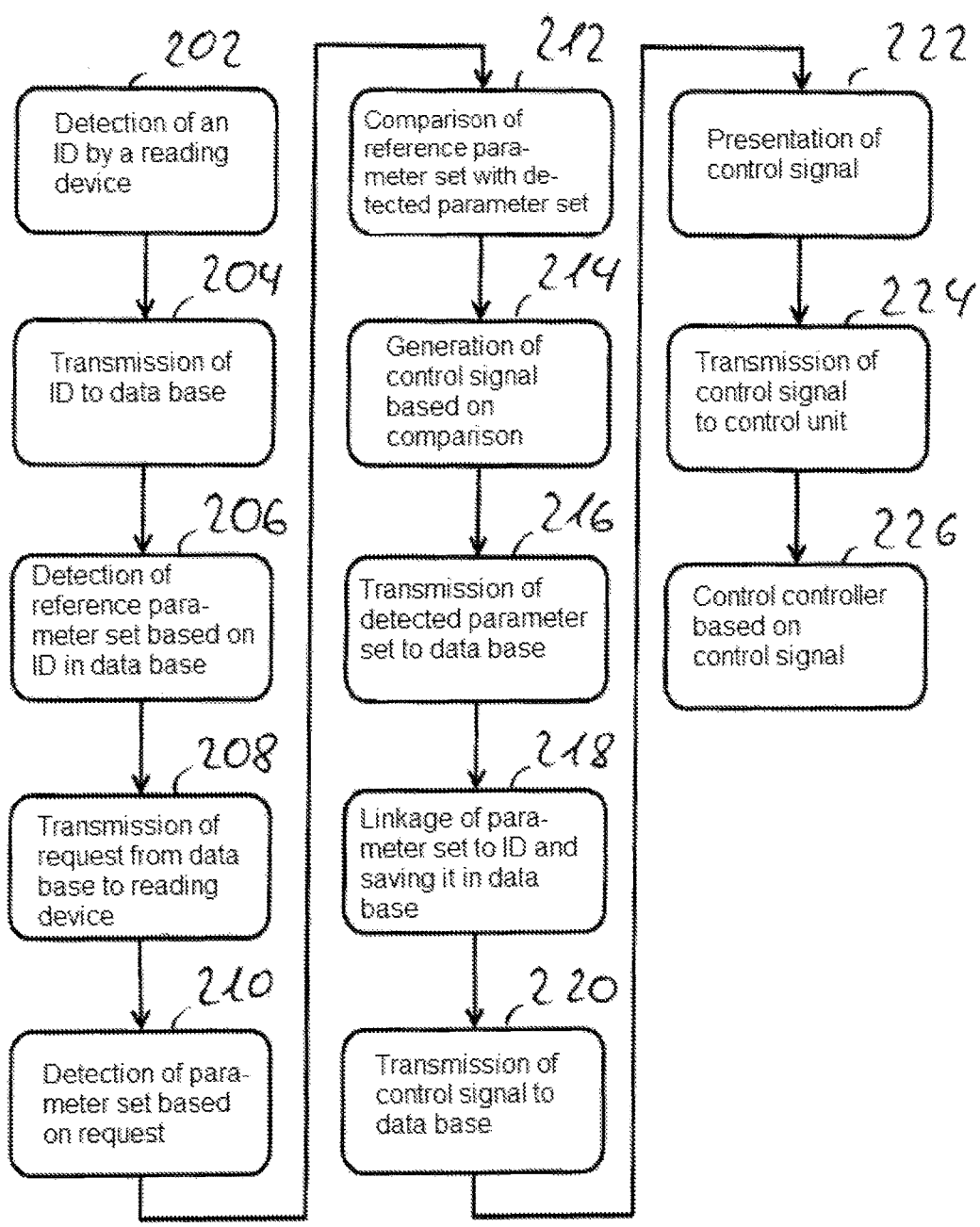

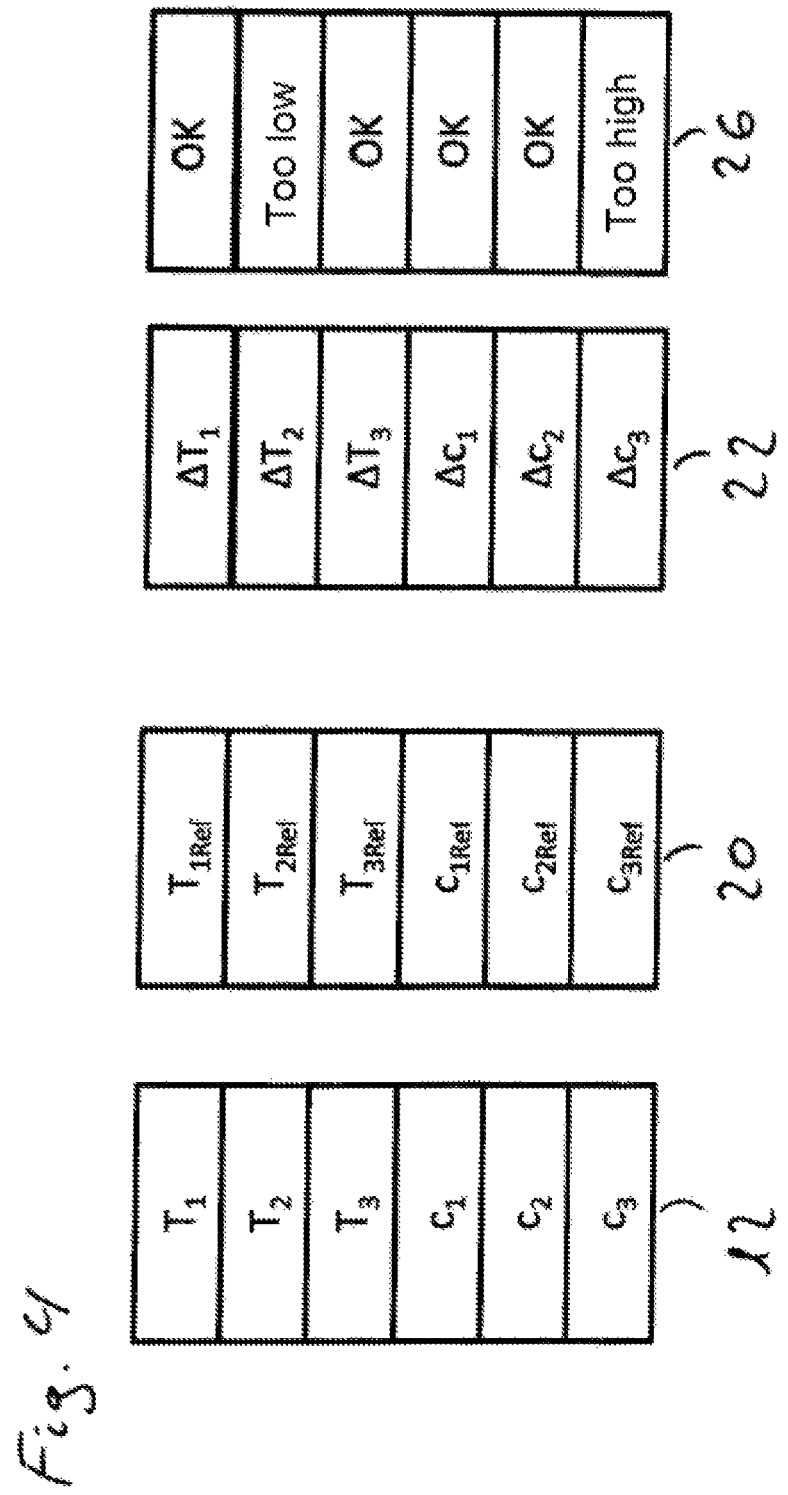

METHOD FOR DETERMINING A PARAMETER SET OF A PERISHABLE PRODUCT AND CONTROL SYSTEM FOR IMPLEMENTING THE METHOD

CROSS-REFERENCE TO RELATED APPLICATIONS

This application claims priority under 35 U.S.C. § 119 to German Patent Application 10 2013 011 987.1 filed Jul. 18, 2013.

BACKGROUND OF THE INVENTION

1. Field of the Invention

The present invention relates to a method for determining a parameter set of a perishable product and a control system designed for implementing the method.

2. Description of the Related Art

Modern production chains for producing and/or processing perishable products, for example food, require a consequent monitoring of parameters or parameter sets and the observance of various minimum standards to ensure the edibility of the produced and/or processed products. This serves the safety of the consumers who have to rely on the innocuousness of the offered perishable products, for example as customers of commercial kitchens. In this connection, the HACCP model ("Hazard Analysis and Critical Control Points") for ensuring the food hygiene has proven suitable which is, for example, also reflected in Directive number 852/2004 of the European Parliament and Council on food hygiene.

Within the scope of the thus required and reasonable documentation and monitoring of the respective production chain, however, substantial additional work and organisational effort is caused in addition to the actual production chain in this way without the actual product being changed thereby.

It is therefore the object of the invention to provide a method for monitoring and documenting a perishable product which can be reliably carried out with little work and organisational effort, particularly without specific previous knowledge/training while at the same time a reliable and continuous monitoring and documentation of the production chain or of the perishable product is ensured.

SUMMARY OF THE INVENTION

According to the invention, this object is solved by an identification (ID) representing the perishable product being identified by a reading device, by the detection of the ID prompting a detection of the parameter set of the product, by a comparison between the identified parameter set and a reference parameter set being carried out, and by a control signal being generated and represented based on the comparison. In this way a complete detection of the parameter set of the perishable product can be ensured, no specific skills or training being required to this end. The detection of the identification rather prompts an automated detection of the parameter set of the perishable product. The detection of the ID may be effected manually or time-controlled, wherein the time-controlled detection of the ID may comprise a time-controlled activation of the reading device with a pre-set ID without the detection of an "external" ID. The detection may be carried out by sensor means integrated in the reading device or controlled by the reading device. In this way it can be ensured that the parameter set of the perishable product is always detected completely and in a constant quality. The parameter set may at least comprise a value characterising the perishable product, particularly a temperature value. The parameter set of the perishable product may, for example, also comprise a plurality of temperature values which are measured at spaced-apart positions within the perishable product. These may, for example, comprise a surface temperature and a core temperature of the perishable product. It is also contemplable that the temperature value indicates an ambient temperature in which the perishable product is stored. The method may enable a simultaneous temperature detection at different positions. The parameter set may, for example, also comprise at least a gas concentration as a value characterising a protective atmosphere. This may, for example, be relevant to ensure a specific shelf life in case of a packing line for a perishable product. A reference parameter set may be compared with the detected parameter set. Based on the deviations between the individual values of the parameter set and of the reference parameter set a control signal may be generated and displayed so that the result of the monitoring and control of the perishable product is directly identifiable. In this way the monitored condition of the perishable product may be monitored and documented in a tamper-proof manner and displayed in a way also comprehensible for non-professionals. Access to the reference parameter set may depend on an authorisation of the user. A time may be linked to the parameter set. The control signal may also be linked to a time.

Usefully it may be contemplated that the reading device is connected to a data base, that the ID and the detected parameter set are transmitted to the data base, that a reference parameter set linked to the ID is identified by the data base, that the comparison between the detected parameter set and the reference parameter set is carried out by the data base, and that the control signal from the data base is transmitted at least to the reading device. In this way the reading device may have a particularly simple design since the reference parameter set is externally stored in a data pool of the data base. Further, an access to various reference parameter sets in the data base which is independent of the reading device may be rendered possible so that various reading devices may be independently used for monitoring and controlling the perishable product at different places as long as they can detect the ID. In this connection, independent of the reading device means that the reading device only has to detect the ID, and that the reference parameter set is managed centrally and only accessed when required. For example, a detection of the ID by customers may be permitted who, in this way, may independently verify a due observance of the production chain of the perishable product prior to a potential purchase. The ID or the reference parameter set may, in this connection, provide other product-related information, for example, about the origin and the manner of preparation.

Alternatively, it may be contemplated that the reading device is connected to a data base, that the ID is transmitted to the data base, that a reference parameter set linked to the ID is identified by the data base, that the reference parameter set is transmitted to the reading device, that the comparison between the parameter set and the reference parameter set is carried out by the reading device, and that the control signal from the reading device is at least transmitted to the data base. In this way as well monitoring and control of the perishable product independent of the reading device can be ensured. Other product-related information may also be provided.

Furthermore, it may be contemplated that the control signal comprises an error code when a deviation between the detected parameter set and the reference parameter set exceeds a threshold value. The error code may, for example, symbolise an impermissible temperature deviation between a value of the detected parameter set and of the reference parameter set, and optionally at the same time comprise an additional suggestion/instruction to correct of the encountered error, for example the temperature deviation. The temperature deviation may have an upward or downward tendency. When the temperature of a cooled perishable product is inadmissibly high the error code may, for example, suggest the "withdrawal" of the detected perishable product, and at the same time suggest/instruct a reduction of the target temperature of the device involved in cooling of the perishable product to prevent a future impermissible increased temperature. When the temperature of a cooled perishable product is substantially below a permissible upper limit the error code may also suggest/instruct an increase of the target temperature of the cooling device to save energy. Analogously, also the temperatures of hot meals, for example at a serving counter, may be monitored and documented. In a protective atmosphere influencing a best-before date an awarded best-before date may depend on a gas concentration detected within the scope of the parameter set.

It may be contemplated that the control signal is represented optically and/or acoustically by the reading device. The optical and/or acoustic representation of the control signal renders cautioning of an impermissible deviation between the parameter set and the reference parameter set of the perishable product possible in a particularly simple manner.

Furthermore, it may be contemplated that the control signal is linked to the ID and saved in the data base for documentation purposes. In this way the documentation of the detected parameter set can be made globally accessible via the data base so that higher-level monitoring, particularly for optimising the production chain of the perishable product, can be realised in a simple manner. A time may facilitate the documentation in connection with the stored parameter set.

In addition, it may be contemplated that the data base generates a reminder/message based on the stored parameter sets, particularly the stored times, and sends it to a contact site responsible for the respective ID if the last detection of the parameter set dates back longer than a predeterminable period of time. The responsible contact site may, for example, be the reading device which carried out the last detection of the parameter set. Alternatively the responsible contact site may also be a person/machine registered in the data base to whom/which a predetermined message is sent as a reminder.

Usefully it may be contemplated that a request is transmitted to the reading device by the data base to acquire the parameter set. The request may comprise the information required for retrieving the parameter set, for example, authorisations for reading out the sensor means, number and type of the parameter of the parameter set to be acquired. In this way a dynamic adjustment of the parameter set to be detected may be realised independent of the reading device, wherein the request may also prevent a non-authorised gathering of the parameter set based on the ID.

It may be contemplated that the ID is optically detected or that the ID stored in the reading device in a pre-set form. The optical detection of the ID is a robust and reliable method which can be carried out with a multitude of different reading devices. A pre-set ID stored in the reading device may be used within the scope of a time-controlled activation of the reading device.

The present invention further relates to a control system designed for implementing each of the methods described above.

BRIEF DESCRIPTION OF THE DRAWINGS

The present invention will be explained below by way of example with reference to the drawings, identical numerals designating the same or similar parts.

FIG. 2 shows a flowchart of a method;
FIG. 3 shows a flowchart of another method;
and
FIG. 4 shows data structures.

DETAILED DESCRIPTION OF THE INVENTION

Figure 1:
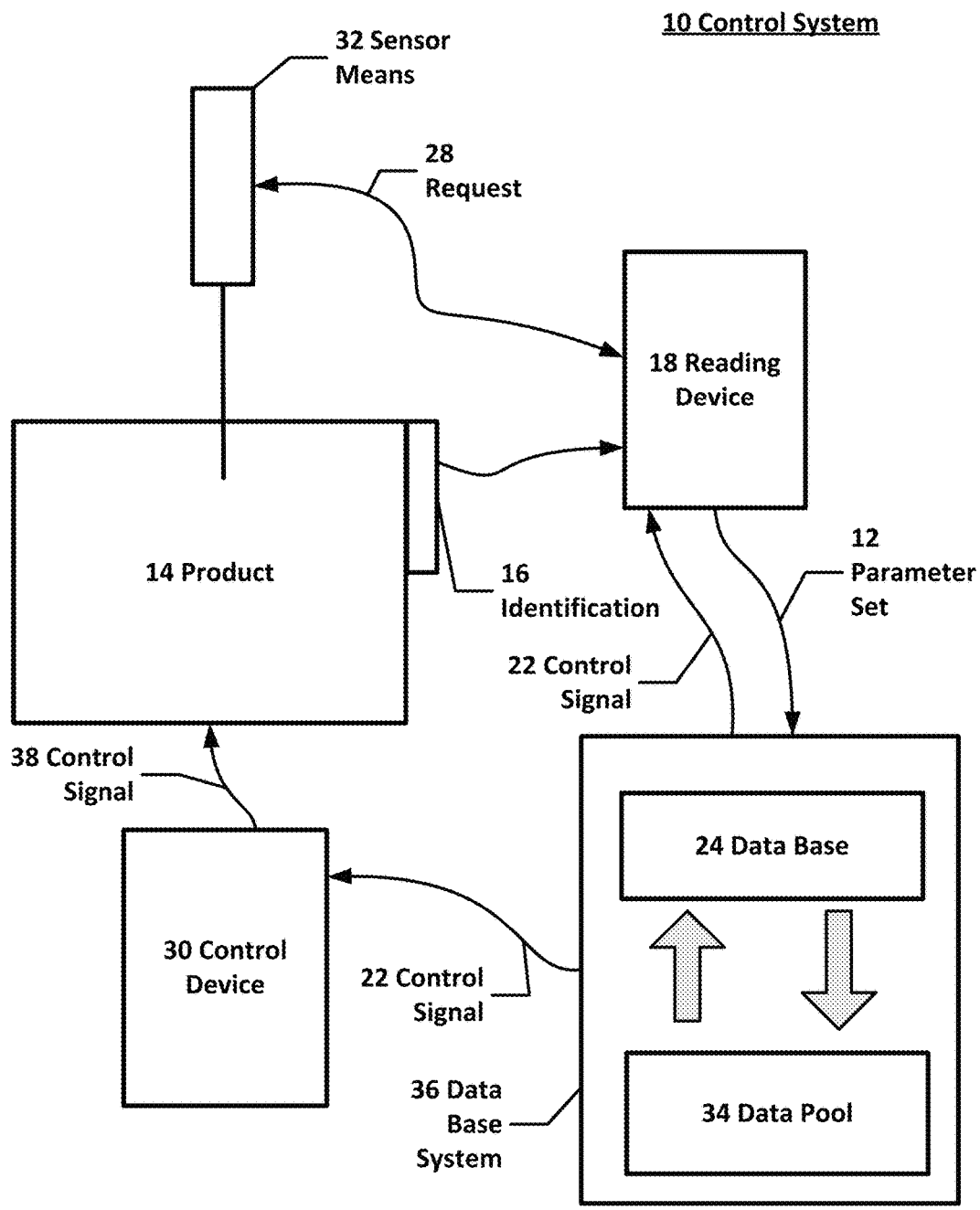
FIG. 1 shows a schematic representation of a control system.

FIG. 1 shows a schematic representation of a control system 10. The control system 10 shown necessarily comprises sensor means 32, a reading device 18, an identification (ID) 16 and a data processing system 36 comprising a data base 24 and an associated data pool 34. Optionally, the control system 10 may comprise a control device 30. The control system 10 may be used for monitoring and documenting a parameter set 12 of a perishable product 14. The perishable product 14 is distinctly identified by the ID 16 here, for example by storing the perishable product 14 in a container identified by the ID 16 or at a place identified by the ID 16. The sensor means 32 may comprise any number of sensors to which the same ID 16 is allocated, or to which different IDs are allocated. The sensor means 32 may also be directly connected to the data base system, for example, in a wireless manner. The sensor means 32 may, for example, be fully or partly integrated in the reading device 18.

The reading device 18 may comprise the identification 16 identifying the perishable product 14, for example as described above. By detecting the identification 16 the reading device 18 may, for example, prompt a request 28 to the sensor means 32 by means of which the parameter set 12 of the perishable product 14 is retrieved. The parameter set 12 may, for example, at least comprise a temperature value of the perishable product 14. The parameter set 12 of the perishable product 14 detected by the sensor means 32 may, accordingly, be identified by the sensor means 32 on the basis of the request 28, and transmitted to the reading device 18. The reading device 18 may transmit the detected parameter set 12 to the data base 24 of the data base systems 36. The data base 24 may compare the detected parameter set with a reference parameter set 20 which may be retrievable from, for example, the data pool 34 of the data base 24. Based on the comparison, the data base 24 may generate a control signal 22 which may, for example, be transmitted to the reading device 18. The reading device 18 may represent the control signal 22. The representation of the control signal 22 on the reading device 18 may, for example, be effected acoustically and/or visually. Optionally, the control signal 22 may also be transmitted to the optional control device 30. The control device 30 may, for example, generate a control signal 38 based on the control signal 22 to achieve an adjustment of the measured parameter set 12 of the perishable product 14. This may, for example, be effected by reducing or increasing the target temperature of means heating/cooling the perishable product 14.

FIG. 2 shows a flowchart of a method. The method 100 illustrated in FIG. 2 may first require an authorisation of a user with regard to the control system which is not explicitly shown. The method shown may then start with a step 102 in which an ID is detected by a reading device. The ID may, for example, be an optically detectable barcode, a smart tag, or the like. The reading device may, for example, be a simple barcode scanner or a smartphone. With the reading device detecting the ID a parameter set characterising the perishable product may be detected in the following step 104. To this end the ID itself may contain required information for detecting the parameter set. For example, the ID may comprise information about the number and type of the values of the parameter set to be detected. The parameter set may, for example, comprise at least one temperature value. The detection of the parameter set may be effected using sensor means which may, for example, only be activatable by information contained in the ID. The coupling used for transmitting the parameter set from the sensor means to the reading device may, for example, be wireless, and particularly a Bluetooth or NFC or WLAN connection. The ID and the detected parameter set may be transmitted to a remote data base in a following step 106 after the detection of the parameter set based on the ID. In a subsequent step 108 a reference parameter set linked to the ID and equivalent to the parameter set in its organisation may be identified in the data base from a data pool of the data base. The reference parameter set may particularly comprise target values for the individual detected values of the parameter set. In a subsequent step 110 the detected reference parameter set may be compared with the detected parameter set, for example, in the data base system accommodating the data base. Based on such comparison a control or corrective signal which is, for example, organised according to the principle of a target-actual comparison between the individual reference values and the individual detected values of the parameter set may be generated in a subsequent step 112. In a subsequent step 114 the detected parameter set may be linked to the ID and saved in the data base, particularly the data pool of the data base. If required, step 114 may also be carried out earlier or later during the implementation of the method 100. In a subsequent step 116 the control signal may be transmitted to the reading device. The control signal transmitted to the reading device may, in a subsequent step 118, be presented by the reading device. The presentation of the control signal may, particularly, be effected optically and/or acoustically by the reading device. For example, an alarm may be generated by the reading device when individual ones among the detected values of the parameter set excessively deviate from the predetermined values of the reference parameter set. In this way a health hazard by the perishable product may be reduced. In a subsequent step 120 the control signal may also be transmitted to a control unit. The control signal may be transmitted to the control unit by the reading device and/or by the data base system. Optionally, another transmission to other places may also be contemplated, for example, to a receiver at an authority responsible for food monitoring, to report irregularities at an early time. The control unit may be adapted to control a controller based on the control signal in a subsequent step 122 to correct the excessively deviating value of the perishable product. For example, the controller may reduce or increase a cooling performance to keep a temperature of the perishable product within a predetermined range. In this way, on the one hand, a premature spoilage of the perishable product, and, on the other hand, an unnecessarily intense cooling of the perishable product may be avoided. For example, a controllable cooling/heating means or a gas supply for generating a protective atmosphere may be understood to be a controller.

FIG. 3 shows another method 200. Analogous to the method 100 according to FIG. 2, the other method 200 illustrated in FIG. 3 may begin with the detection of an ID by a reading device in a step 202. Optionally, again a previous authorisation of a person operating the reading device may be effected. The reading device may also operate automatically on a time-controlled basis. In a subsequent step 204 the detected ID may be directly transmitted to a data base. In a subsequent step 206 a reference parameter set may be identified based on the ID in the data base. In a subsequent step 208 a request from the data base may be transmitted to the reading device. The request may, in particular, prompt the detection of the parameter set by the reading device. In a subsequent step 210 the parameter set may be identified based on the request. The request may, for example, prevent a non-authorised readout of the sensor means. In a subsequent step 212 the reference parameter set may be compared with the detected parameter set. The reference parameter set may be transmitted to the reading device by the data base, and be compared with the parameter set in the reading device for this purpose. This may, for example, be realised by the reference parameter set being transmitted to the reading device as a part of the request, or substantially being the request. In a subsequent step 214 a control signal may be generated based on the comparison. Subsequently, the detected parameter set may be transmitted to the data base in a step 216. In a subsequent step 218 the parameter set may be linked to the ID and saved in the data base. In a subsequent optional step 220 the generated control signal may also be transmitted to the data base. In a subsequent step 222 the control signal may be presented by the reading device, particularly acoustically and/or optically. In a subsequent step 224 the generated control signal may also be optionally transmitted to a control unit. Analogous to step 122, a controller may be controlled based on the control signal in a subsequent step 226.

The other method 200 illustrated in FIG. 3 thus differs from the method 100 according to FIG. 2 particularly in that the comparison between the reference parameter set and the detected parameter set is shifted from the data base to the reading device. With regard to the remaining functional principle the method 100 and the other method 200 are identical in substantial parts, wherefrom particularly also possibilities for alternative orders of the method steps shown sequentially arise.

FIG. 4 shows data structures. In FIG. 4, first the parameter set 12 is illustrated. The parameter set 12 shown in FIG. 4, to begin with, comprises three independent temperature values $T1$, $T2$ and $T3$ as well as three other concentration values $c1$, $c2$ and $c3$. The temperature values $T1$ and $T2$ may, for example, be detected by two temperature sensors which are disposed in different positions within a single cooling container. $T3$ may, for example, be another temperature value measured in a heating container. The concentration values $c1$, $c2$ and $c3$ may, for example, characterise a protective atmosphere present in a packing line and determine, for example, the carbon dioxide concentration, the nitrogen concentration and the oxygen concentration depending on the perishable product using gas sensors. Such protective atmospheres have a substantial influence on the shelf life of the packaged perishable product.

FIG. 4 further shows a reference parameter set 20 including reference values $T1Ref$, $T2Ref$, $T3Ref$, $c1Ref$, $c2Ref$ and $c3Ref$ for the temperature and concentration values of the parameter set 12. The parameter set 12 and the associated reference parameter set 20 which are or will be linked to the ID, respectively, may comprise at least one value.

A control signal 22 may be generated based on a difference formation between the parameter set 12 and the reference parameter set 20 and accordingly comprise temperature differences and concentration differences as values. The control signal 22 may further also comprise an error code 26 which may characterise an evaluation of the deviation according to a target-actual principle based on predeterminable threshold values for the individual detected temperature and concentration values. For example, the temperature difference ΔT1 may be sufficiently small while the temperature difference ΔT2 is outside of a predeterminable threshold range. For example, the temperature difference ΔT2 may be signed too low, i.e., for example, significantly smaller than 0, when a detected temperature value T2 is considerably smaller than the required temperature value T2Ref. In this case it may reasonable to control a controller, for example, of a cooling device, based on the control signal 22 to increase a target temperature value so as to achieve a reduction of the temperature difference ΔT2 for saving energy.

The features of the invention disclosed in the above description, in the drawings as well as in the claims may be important for the realisation of the invention both individually and in any combination.

LIST OF NUMERALS 10 control system
12 parameter set
14 product
16 identification (ID)
18 reading device
20 reference parameter set
22 control signal
24 data base
26 error code
28 request
30 control device
32 sensor means
34 data pool
36 data base system
38 control signal
100 method
102 detection of an ID by a reading device
104 detection of parameter set based on ID
106 transmission of ID and parameter set to data base
108 detection of reference parameter set based on auf ID
110 comparison of reference parameter set with detected parameter set
112 generation of control signal based on auf comparison
114 linking of parameter set to ID and saving it in data base
116 transmission of control signal to reading device
118 presentation of control signal
120 transmission of control signal to control unit
122 control controller based on control signal
200 other method
202 detection of an ID by a reading device
204 transmission of ID to data base
206 detection of reference parameter set based on ID in data base
208 transmission of request from data base to reading device
210 detection of parameter set based on request
212 comparison of reference parameter set with detected parameter set
214 generation of control signal based on comparison
216 transmission of detected parameter set to data base
218 linking parameter set to ID and saving it in data base
220 transmission of control signal to data base
222 presentation of control signal
224 transmission of control signal to control unit
226 control of controller based on control signal

What is claimed is:

1. A method for determining a parameter set of a perishable product by a user, the method comprising the steps of:
   (a) detecting by a smartphone an identification representing the perishable product in a container;
   (b) upon detection of the identification, automatically detecting, by a sensor, the parameter set of the perishable product;
   (c) comparing the parameter set to a reference parameter set to prepare a comparison; and
   (d) generating and presenting a control signal based on the comparison to the user to determine the quality of the perishable product;
   wherein step (b) is performed by the smartphone controlling the sensor;
   wherein step (b) is performed by the determining the parameter set simultaneously from two different positions inside the container.

2. The method according to claim 1, wherein the smartphone is connected to a database;
   wherein the method further comprises the steps of transmitting the identification and the parameter set to the database, identifying by the database the reference parameter set linked to the identification, and transmitting by the database the control signal to the smartphone; and
   wherein step (c) is performed by the database.

3. The method according to claim 1, wherein the smartphone is connected to a database;
   wherein the method further comprises the steps of transmitting the identification to the database, identifying by the database the reference parameter set linked to the identification, and transmitting by the smartphone the control signal to the database; and
   wherein step (c) is performed by the smartphone.

4. The method according claim 1, wherein the control signal comprises an error code when a deviation between the parameter set and the reference parameter set is greater than a threshold value.

5. The method according to claim 1, wherein the control signal is optically or acoustically represented by the smartphone.

6. The method according to claim 2, wherein the control signal is linked to the identification and stored in the database for documentation purposes.

7. The method according to claim 2, further comprising a step of transmitting a request from the database to the smartphone to detect the parameter set.

8. The method according to claim 1, wherein step (a) is performed by detecting the identification optically.

9. The method according to claim 1, further comprising the step of storing the identification in the smartphone in a pre-set form.

10. The method according to claim 3, wherein the control signal is linked to the identification and stored in the database for documentation purposes.

11. The method according to claim 3, further comprising a step of transmitting a request from the database to the smartphone to detect the parameter set.

12. A control system for determining a quality of a perishable product by a user, the system comprising:

a container;

a reference parameter set for describing a first condition of the perishable product;

an identified parameter set for describing a second condition of the perishable product, a comparison between the first condition and the second condition describing the quality of the perishable product;

a smartphone for detecting an identification representing the perishable product, the identified parameter set being temperature;

a sensor integrated with the smartphone or being controlled by the smartphone, the sensor for automatically detecting the identified parameter set of the product upon detection of the identification;

a control signal;

wherein the parameter set is compared to the reference parameter set to prepare the comparison, and the control signal based on the comparison is generated and presented to the user to determine the quality of the perishable product;

wherein the sensor determines the identified parameter set simultaneously from two different positions inside the container.

13. The control system according to claim 12, wherein the smartphone is connected to a database.

14. A method for determining a parameter set of a perishable product by a user, the method comprising the steps of:
(a) detecting by a smartphone an identification representing the perishable product in a container;
(b) upon detection of the identification, automatically detecting, by a sensor, the parameter set of the perishable product;
(c) comparing the parameter set to a reference parameter set to prepare a comparison; and
(d) generating and presenting a control signal based on the comparison to the user to determine the quality of the perishable product;

wherein steps (a) and (b) are performed by the smartphone controlling the sensor;

wherein step (b) is performed by determining the parameter set simultaneously from two different positions inside the container.

15. The method according to claim 14, wherein the smartphone is connected to a database;
wherein the method further comprises the steps of transmitting the identification and the parameter set to the database, identifying by the database the reference parameter set linked to the identification, and transmitting by the database the control signal to the smartphone; and
wherein step (c) is performed by the database.

16. The method according to claim 14, wherein the smartphone is connected to a database;
wherein the method further comprises the steps of transmitting the identification to the database, identifying by the database a reference parameter set linked to the identification, and transmitting by the smartphone the control signal to the database; and
wherein step (c) is performed by the smartphone.

17. The method according claim 14, wherein the control signal comprises an error code when a deviation between the parameter set and the reference parameter set is greater than a threshold value.

18. The method according to claim 14, wherein the control signal is optically or acoustically represented by the smartphone.

19. The method according to claim 15, wherein the control signal is linked to the identification and stored in the database for documentation purposes.

20. The method according to claim 15, further comprising a step of transmitting a request from the database to the smartphone to detect the parameter set.

* * * * *